Nov. 29, 1966  R. F. WRENCH  3,287,791
TURRET ASSEMBLY
Filed June 3, 1965  2 Sheets-Sheet 1
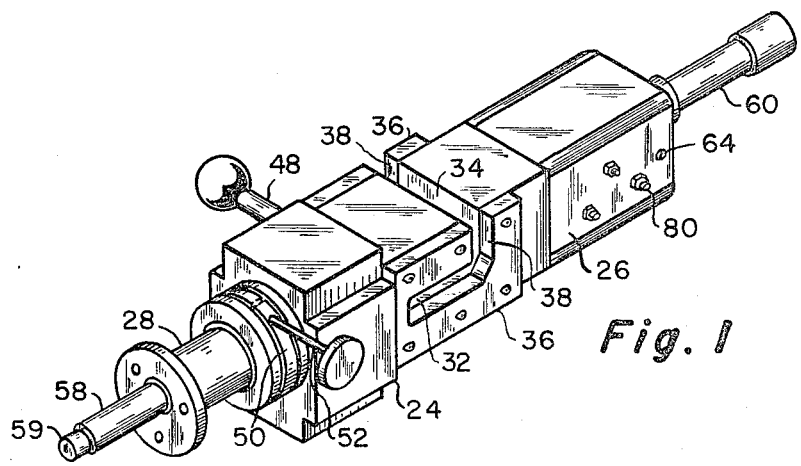
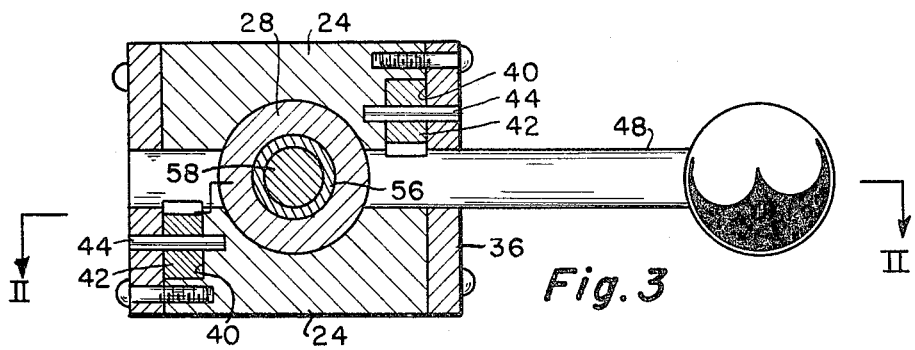
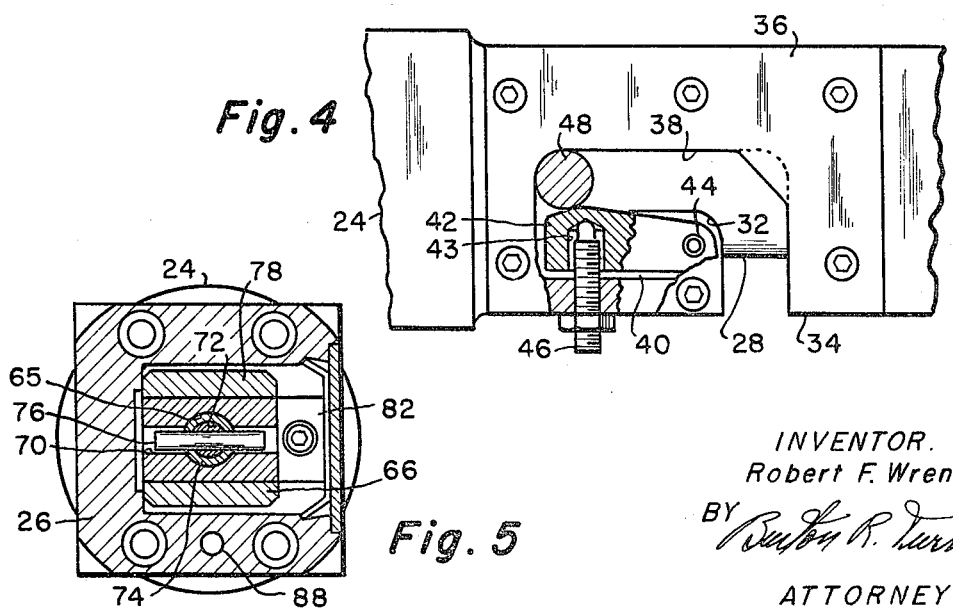
INVENTOR.
Robert F. Wrench
BY
ATTORNEY INVENTOR.
Robert F. Wrench
BY
*Burton R. Turner*
ATTORNEY 3,287,791
TURRET ASSEMBLY
Robert F. Wrench, Corning, N.Y., assignor to Corning Glass Works, Corning, N.Y., a corporation of New York
Filed June 3, 1965, Ser. No. 461,041
14 Claims. (Cl. 29—35.5)

This invention relates to a novel machine structure for manipulating tools and the like, and more particularly to a turret-like machine assembly for imparting both longitudinal and rotational movement to tool mounting portions carried thereby so as to manipulate and position such portions in desired orientation.

In the past, a problem of downtime for changing worn cutting heads or elements has been encountered in the machine tool art. Multiple head units, of course, have been utilized, but the mode of operating such heads for effecting utilization has not been completely satisfactory.

The present invention obviates these problems by providing an easily operated mechanism for not only rotating a multiple head attachment so as to locate one cutting head in an operative positive while permitting the replacement of another head rotated into an inoperative position, but also provides a quick-acting longitudinal movement toward and away from a work article for quickly positioning a tool in contact with and removing the same from the work article.

It thus has been an object of the invention to provide a novel structure for both rotatably and longitudinally positioning tool elements in a desired orientation with respect to a work article.

A further object of the invention has been to provide a turret-like machine assembly for rotating a multiple tool head attachment through a predetermined arc so as to not only position one tool head in an operative orientation, but also facilitate the removal and replacement of another tool head while in an inoperative position.

An additional object of the invention has been to provide a turret assembly for machine tools having a longitudinally-slidable auxiliary tool mounting portion which may be positioned toward and away from a work article with a quick or snap-action movement.

These and other objects of the invention will become apparent to those skilled in the art from the following disclosure and accompanying drawings in which:

FIGURE 1 is a perspective view of a turret assembly embodying the instant invention;

FIGURE 3 is a cross-sectional view in elevation taken along line III—III of FIGURE 2;

FIGURE 4 is a fragmental cut-away view of the right side of FIGURE 3; and

FIGURE 5 is a cross-sectional view in elevation taken along lines V—V of FIGURE 2.

Figure 2:
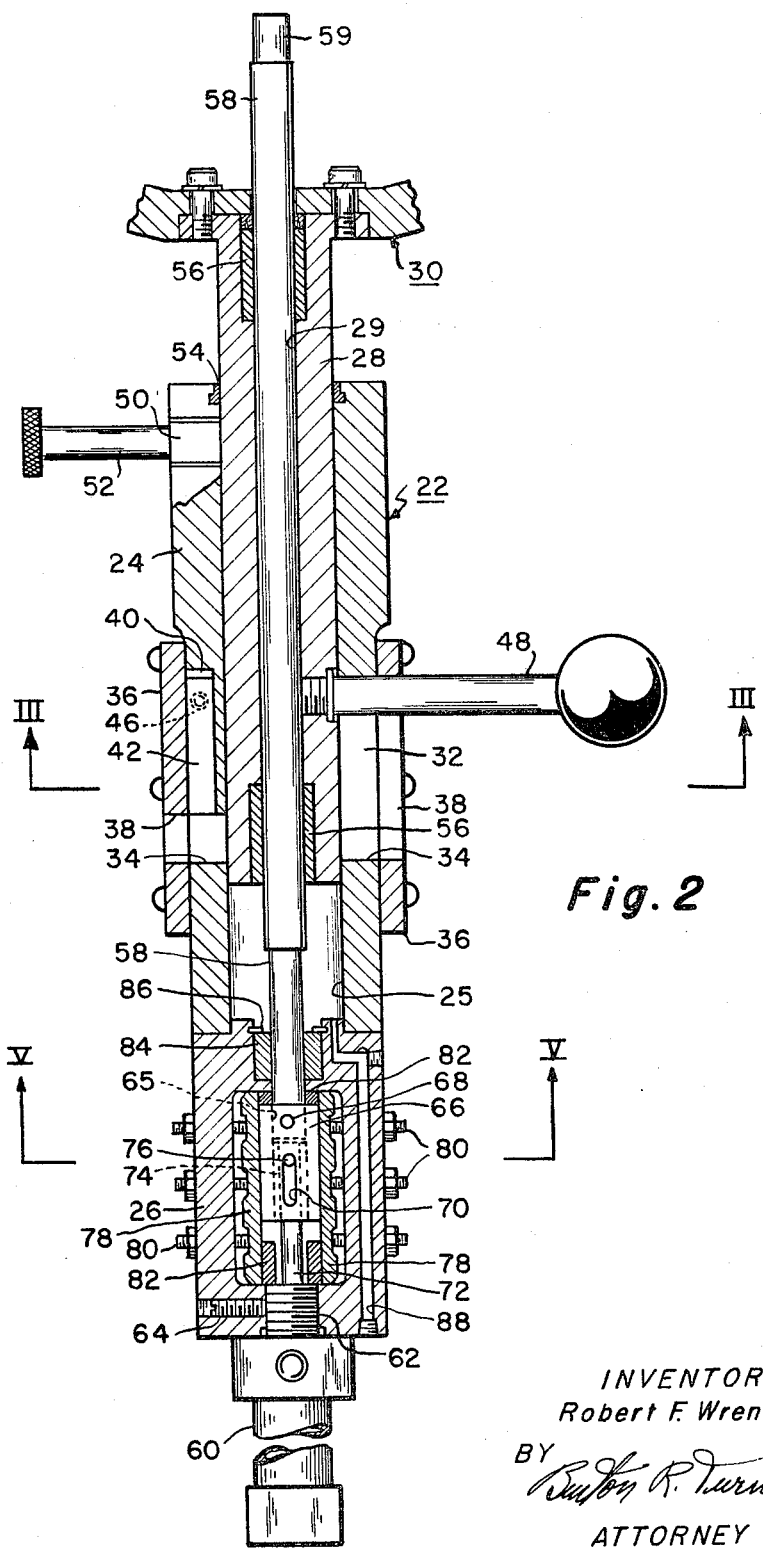
FIGURE 2 is a plan view, partially in section, of the tool holder turret assembly shown in FIGURE 1, but with the section taken along line II—II of FIGURE 3.

Referring now to the drawings, and particularly of FIGURES 1 and 2, a tool holder turret assembly 22 is shown having a hollow turret housing 24 with a cylinder or guide housing 26 secured in axial alignment to a rearward end of the turret housing. A barrel or sleeve 28, having a suitable multiple head attachment 30 secured to the end thereof, is slidably and rotatably mounted within the bore 25 of the turret housing 24. The housing 24 is provided with an L-shaped slot 32 (see also FIGURE 4) which extends transversely across the housing and has an upwardly open portion 34. A ware plate 36, having a complementary L-shaped slot 38, is secured to each side of the turret housing 24 so that the L-shaped slots are in alignment.

A recess 40 is formed in each side of the turret housing 24 adjacent the L-shaped slot 32, and as shown more particularly in FIGURES 3 and 4, receives a locking cam 42 pivotally mounted to the ware plate 36 by means of a roll pin 44. A spring tensioned plunger 46 extends through an upper surface of housing 24 and into a recessed portion 43 of each locking cam 42 to urge such cam downwardly. An operating handle 48 extends through the L-shaped slots 32 and 38, and engages the barrel or sleeve 28 so as to rotate such barrel through an arc of substantially 180° by means of the L-shaped slots, and lockably retain such barrel in position through a longitudinal sliding movement under the spring tensioned locking cams 42 which engage the handle 48.

A split clamping ring 50 is formed in the forward upper half of the turret housing 24 and has a pair of aligned openings on opposite sides of a longitudinal slit formed adjacent the top thereof. A threaded tightening lever 52 cooperably engages such aligned openings to tighten the split ring 50 about the positioned barrel or sleeve 28 and securely clamp it in such desired position. A sealing or wiping ring 54 is positioned within a recessed portion of the bore 25 to prevent foreign matter from entering the bore during the sliding movement of the sleeve 28. A pair of cylindrical bearings 56 are positioned within recesses formed in each end of a bore 29 extending through the sleeve 28, and slidably receive and guide a tool push rod 58 which extends outwardly beyond both ends of the sleeve 28, and has an auxiliary tool mounting portion 59 at its outer end.

The longitudinal motion imparted to the tool push rod 58 is achieved by means of the operating mechanism retained in cylinder or guide housing 26 and an associated air cylinder 60. Such operating mechanism has been designed to impart an impact quick-acting movement in the nature of a snap action to the push rod 58. The cylinder 60 is threadably secured at 62 to a rearward end of the housing 26, and is locked in position by a setscrew 64. A reduced rearward portion of the push rod 58 projects into the guide housing 26 and into a longitudinal bore 65 of a hollow guide coupling 66. A dowel pin 68 passes through aligned openings in the rod and coupling so as to securely fasten the two together. The coupling is provided with a longitudinal slot 70 which extends vertically therethrough. The air cylinder 60 is provided with a piston rod 72, having a cylindrical adapter 74 to cooperably slide within the bore 65 of the guide coupling 66. A vertically projecting pin 76 extends through aligned openings in the adapter and piston rod to secure the two together. The pin 76 further projects into the longitudinal slot 70 of the guide coupling 66, to provide a sliding lost-motion connection with the guide coupling.

A pair of anti-torque coupling plates 78 are retained within the guide housing 26 on opposite sides of the guide coupling 66 by means of a plurality of adjustment screws 80. The plates 78 guide the longitudinal sliding movement of the guide coupling 66, while preventing the rotatable sleeve 28 from imparting a torsional movement to the push rod 58. A pair of U-shaped stroke-control spacer blocks 82 are positioned within the housing 26 to adjust and limit the forward and rearward movement of the guide coupling 66. A bearing 84, held in position by a retainer ring 86, is positioned adjacent the forward end of the housing 26 to facilitate the sliding movement of the push rod 58. A vent passage 88 extends through the housing 26 so as to vent the bore 25 of the turret housing 24 rearwardly of the barrel or sleeve 28, so as to facilitate its rearward movement within such bore.

In operation, with the piston rod 72, guide coupling 66, and push rod 58 in their extended or forward most position as shown in FIGURE 2, the cylinder 60 is actuated to retract the piston rod 72. Accordingly, the piston rod 72 begins its rearward travel picking up momentum in its progress. As it travels rearwardly, the pin 76 slides backwardly in the slot 70 until it hits the rearward end of such slot, providing an impact or snap action movement to the push rod 58 through the guide coupling 66. In a like manner, when it is again desired to impart forward movement to the push rod 58, the cylinder 60 is actuated to move piston rod 72 forwardly. The rod picks up momentum as pin 76 slides forwardly in slot 70 until it hits the forward end thereof and causes an impact or snap action forward movement to be supplied to push rod 58 through the guide coupling 66. The snap action provided by the mechanism to rod 58 may be utilized to quickly present a tool to a work article without vibration or chatter, and provide a clean break when removing such tool from the ware.

In addition, the split clamping ring 50 may be loosened by lever 52 and operating handle 48 actuated to rotate barrel or sleeve 28 through a desired arc, to thus pivot the multiple head attachment member 30 and rotate a reserve or idle tool into an active tool position while simultaneously conveying a used tool into a removal position. The used tool may then be removed from the tool mounting assembly and a replacement tool positioned therein without necessitating downtime of the machine. It thus can be seen, that with this novel tool holder turret assembly, it is possible to change the cutting tools on-the-fly without necessitating downtime.

If desired, a plurality of slots may communicate with the upwardly open portion 34 of the L-shaped slot 32, so as to permit the rotation of barrel 28 and its associated multiple head member 30 through a plurality of equal predetermined arcs, commensurate with the number of tool heads affixed to the multiple head attachment 30. Also if desired, rod 58 may be keyed to barrel 29, and guide plates 78 provided with complementary curvilinear inner surfaces so as to facilitate unitary rotational movement between sleeve 28 and rod 58.

Although I have disclosed the now preferred embodiment of the invention, it will be apparent to those skilled in the art that various changes and modifications may be made thereto without departing from the spirit and scope thereof as defined in the appended claims.

I claim:

1. An improved tool manipulating mechanism comprising, a housing having a longitudinal bore, a barrel slidably and rotatably mounted within said bore, means for sliding said barrel longitudinally of said bore and for rotating said barrel about the longitudinal axis of said bore, a rod mounted within said barrel for longitudinal sliding movement independently of longitudinal sliding movement imparted to said barrel, and means for imparting quick-acting longitudinal movement to said rod.

2. An improved tool manipulating mechanism comprising an outer housing, a sleeve mounted for longitudinal and rotational movement within said housing, means extending through an opening in said housing and engaging said sleeve for imparting both longitudinal and rotational movement to said sleeve relative to said housing, means on said housing for locking said sleeve in a desired positionment within said housing, rod means slidably mounted within said sleeve, and means for imparting longitudinal sliding movement to said rod means independently of movement imparted to said sleeve.

3. A tool manipulating mechanism as defined in claim 2 wherein said means for imparting both longitudinal and rotational movement to said sleeve comprises an operating handle secured at one end to said sleeve and projecting outwardly therefrom through an L-shaped slot formed in said housing, and tensioned locking cam means for engaging said handle and locking the same in a desired positionment.

4. A tool manipulating mechanism as defined in claim 2 wherein said means for locking said sleeve in a desired positionment within said housing comprises a split clamping ring portion forming a part of said housing and having a pair of transversely aligned openings on opposite sides of a slit extending longitudinally of said housing, and threaded tightening means cooperating with said aligned openings for tightening said split clamping ring portion about said sleeve to retain it in a desired positionment within said housing.

5. A tool manipulating mechanism as defined in claim 2 wherein said means for imparting sliding movement to said rod means includes an air cylinder having a piston rod, and lost-motion linkage connecting said piston rod to said rod means so as to impart snap-action movement to said rod means.

6. An improved turret assembly construction for angularly and longitudinally positioning a plurality of tools in desired orientation relative to a work piece which comprises, a housing body having a longitudinal bore extending therethrough, a guide housing secured to a rearward end of said housing body in axial alignment with said bore, an air cylinder secured to a rearward end of said guide housing and having a piston rod extending into said housing in axial alignment therewith and with said bore, means slidably and rotatably positioned within said bore, rod means mounted for longitudinal sliding movement along the axis of said bore, and means connecting said rod means and said piston rod for imparting an impact type quick-acting movement to said rod means upon actuation of said air cylinder.

7. A turret assembly as defined in claim 6 wherein said connecting means comprises a guide coupling secured to the rearward end of said rod means and longitudinally slidably mounted within said guide housing between predetermined end limits, a longitudinal slot formed in said guide coupling, and transverse pin means slidable within said longitudinal slot for connecting said piston rod and said guide coupling together with a lost motion coupling.

8. A turret assembly as defined in claim 6 wherein said slide and rotatable means is a sleeve member having one end projecting into the bore of said housing body and surrounding said rod means, operating means extend through an opening in said housing body for slidably and rotatably manipulating said sleeve member within said bore, and vent means communicate with said bore rearwardly of said sleeve member to facilitate its longitudinal sliding movement within such bore.

9. A tool holder turret assembly for longitudinally and rotatably manipulating a plurality of tool heads for desired positionment with respect to a work piece which comprises, a housing body having a longitudinally extending bore formed in said housing body, a guide housing positioned on a rearward end of said housing body in axial alignment with said bore, an air cylinder secured to a rearward end of said guide housing and having a piston rod extending into said guide housing in axial alignment with the longitudinal axis of said bore, a sleeve member positioned within said bore for both longitudinal and rotational movement, an angular slotted opening formed in said housing body in communication with said bore, operating means connected to said sleeve member and extending through said slotted opening for imparting both rotational and longitudinal sliding movement to said sleeve member relative to said housing body, rod means extending through said sleeve member for longitudinal sliding movement along the axis of said bore, and lost-motion linkage connecting said piston rod to said rod means for imparting an impact type quick-acting longitudinal movement to said rod means upon actuation of said air cylinder.

10. A turret assembly as defined in claim 9 wherein said housing body has a pair of recessed portions adjacent said angular slotted opening, and a pair of tensioned locking cams are pivotally positioned within said recessed portions to operatively engage said operating means and lock it in desired end positionments.

11. A turret assembly as defined in claim 9 wherein said housing body is provided with a split clamping ring portion surrounding said sleeve member, and means for tightening said split clamping ring portion about said sleeve member to securely lock said sleeve member in a desired positionment obtained through the manipulation of said operating means.

12. A turret assembly as defined in claim 9 wherein said lost-motion linkage includes a guide coupling secured to said rod means and longitudinally slidable within said guide housing between predetermined end limits, a longitudinal slot extending through said guide coupling, and pin means extending through said piston rod and slidably positioned within said longitudinal slot for slidably connecting said piston rod and said guide coupling together.

13. A turret assembly as defined in claim 12 wherein said guide housing is provided with a pair of adjustable guide plates for guiding and aligning the longitudinal sliding movement of said guide coupling, and spacer blocks are positioned at each end of said guide housing to adjust and limit the longitudinal stroke of said guide coupling.

14. A turret assembly as defined in claim 9 wherein said guide housing is provided with a vent passage which communicates between the atmosphere and the bore of said housing body rearwardly of said sleeve member to facilitate the longitudinal sliding movement of said sleeve member within said bore.

No references cited.

RICHARD H. EANES, JR., *Primary Examiner.*